United States Patent [19]
Bazzica

[11] Patent Number: 5,370,515
[45] Date of Patent: Dec. 6, 1994

[54] MACHINE FOR MANUFACTURING POLYSTYRENE FOAM PRODUCTS

[75] Inventor: Carlo Bazzica, Foligno, Italy

[73] Assignee: Bazzica Engineering di Carlo Bazzica & C. S.A.S., Trevi, Italy

[21] Appl. No.: 65,180

[22] Filed: May 20, 1993

Related U.S. Application Data

[62] Division of Ser. No. 713,134, Jun. 10, 1991, Pat. No. 5,238,624.

[30] Foreign Application Priority Data

Jun. 12, 1990 [IT] Italy .................. 67428 A/90

[51] Int. Cl.$^5$ .................. B29C 39/24; B29C 45/64
[52] U.S. Cl. .................. 425/4 R; 425/589; 425/595; 425/451; 425/451.7; 425/453; 425/457; 425/DIG. 221
[58] Field of Search .................. 425/4 R, 817 R, 589, 425/595, 451, 451.7, 453, 457, DIG. 221; 264/DIG. 10

[56] References Cited

U.S. PATENT DOCUMENTS

| | | | |
|---|---|---|---|
| 3,141,192 | 7/1964 | Benedetto | 425/595 |
| 3,837,769 | 9/1964 | Erlenbach | 425/4 R |
| 4,106,884 | 8/1978 | Jegelka | 425/4 R |
| 4,315,727 | 2/1982 | Black | 425/595 |
| 4,976,602 | 12/1990 | Yamazaki | 425/595 |
| 5,234,337 | 8/1993 | Hehl | 425/595 |

FOREIGN PATENT DOCUMENTS 0190663  8/1986  European Pat. Off. .
2295832  8/1976  France .................. 425/595

OTHER PUBLICATIONS

Kunststoffe, vol. 79, No. 10, Oct. 1988, pp. 984–990, Munich, DE; R. K. Hasloch: "EPS-Formteil-und Blockverabeitung" *p. 986, column 2*.
Modern Plastics International, vol. 18, No. 10, Oct. 1988, pp. 42–45, Lausanne, CH; P. Mapleston: "New technologies broaden scope for bead molding equipment" *p. 44, columns 2-3.

*Primary Examiner*—Khanh Nguyen
*Attorney, Agent, or Firm*—Klauber & Jackson

[57] ABSTRACT

A machine for manufacturing polystyrene foam products, whereby a mold comprising a first half and a second half mold defining a molding chamber when closed, is loaded, with the two half molds locked in the closed position, onto the machine and into an operating position wherein the mold is connected automatically to granular polystyrene and utility fluid supply lines. In this operating position, the two half molds are rendered mutually mobile with the first half mold, connected to the utility supply lines, remaining locked to a fixed frame on the machine, and the second half mold remaining locked to a mobile frame on the machine.

4 Claims, 4 Drawing Sheets

MACHINE FOR MANUFACTURING POLYSTYRENE FOAM PRODUCTS

This is division of application Ser. No. 07/713,134, filed Jun. 10, 1991, now U.S. Pat .No. 5,238,624.

BACKGROUND OF THE INVENTION

The present invention relates to a method of manufacturing polystyrene foam products.

As yet, polystyrene foam products are generally manufactured on molding machines comprising a first and second replaceable half mold which, when mated, define a molding chamber.

Known molding machines of the aforementioned type usually comprise a fixed portion or frame on to which the first half mold, hereinafter referred to as the fixed half mold, is fitted substantially manually in a fixed position. Thus mounted, the fixed half mold is then connected manually to the lines supplying the material for molding, i.e. polystyrene granules, and the utilities (steam, air, etc.), and which are usually located on the fixed frame.

Known molding machines also comprise a mobile portion or frame connected to the fixed frame so as to move back and forth, in relation to the same, by a given distance and in a given direction. The mobile frame is fitted manually with the second half mold, which hereinafter is therefore referred to as the mobile half mold.

The above molding process, commencing with assembly of the mold on to the machine, is therefore relatively time-consuming, and the downtime involved for changing the mold is such as to seriously increase production cost.

SUMMARY OF THE INVENTION

The aim of the present invention is to provide a method of manufacturing polystyrene foam products, designed to overcome the aforementioned drawbacks.

In particular, the aim of the present invention is to provide a method of manufacturing polystyrene foam products, designed to minimise the time required for assembling and/or changing the mold.

With this aim in view, according to the present invention, there is provided a method of manufacturing polystyrene foam products on a molding machine featuring a mold comprising a first and second half mold which, when closed, define a molding chamber, said first half mold comprising an output portion of a line supplying granular polystyrene, and output portions of lines supplying utility fluids; said molding machine comprising a fixed frame connectable to said first half mold and having input portions of said supply lines, and a mobile frame connectable to said second half mold and connected to said fixed frame so as to move back and forth, in relation to the same, in a given operating direction and to and from a position contacting said fixed frame; said method being characterised by the fact that it comprises stages consisting in axially displacing said mold in relation to said fixed frame and in said operating direction, with said half molds locked in releasable manner in said closed position, said mold being displaced, in relation to said fixed frame, into an operating position wherein fixed half couplings on said input portions of said supply lines connect automatically with respective mobile half couplings on said output portions of said supply lines, said fixed and mobile half couplings being arranged facing one another in said operating direction; in locking said first half mold in said operating position via bolt means on said fixed frame; in moving said mobile frame into said contact position and into engagement with said second half mold in said closed position over said first half mold in said operating position; in rendering said half molds independent for enabling said mobile frame to move back and forth in said operating direction, thus opening and closing said mold; and in feeding said granular polystyrene and said utility fluids into said molding chamber while said mold is closed.

According to the above method, during at least a portion of said displacement, said second half mold in said closed position over said first half mold preferably engages said mobile frame; said mobile frame being moved from said contact position so as to move said mold into said operating position.

According to the present invention, there is also provided a machine for manufacturing polystyrene foam products, said machine comprising a fixed frame; a mobile frame connected to said fixed frame so as to move, in relation to the same, back and forth in a given operating direction and to and from a contact position; a mold in turn comprising a first and second half mold defining, when closed, a molding chamber; a line supplying granular polystyrene and a number of lines supplying utility fluids, each said supply line comprising an input portion on said fixed frame and an output portion on said first half mold; and first and second lock means for respectively locking said first half mold in an operating position on said fixed frame, and said second half mold on to said mobile frame; characterised by the fact that it also comprises releasable means for connecting said half molds in said closed position; and a mobile half coupling and fixed half coupling located on each said supply line and arranged facing each other in said operating direction, the mobile and fixed half couplings of each said supply line being connected in said operating position for connecting said respective input and output portions, and being respectively integral with said fixed frame and said first half mold; said first lock means comprising bolt means, and said second lock means comprising releasable coupling means for connecting said mobile frame and said second half mold.

Said coupling means on the above machine preferably comprise at least a first element integral with said second half mold, and a second element integral with said mobile frame and selectively connectable to said first element in two distinct positions, each corresponding to a respective position of said second half mold and said mobile frame in said operating direction; one of said two positions being such that, when said first half mold is in said operating position and said mobile frame is moved into said contact position, said second half mold moves into said closed position.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Number 1 in the accompanying drawings indicates a machine for manufacturing polystyrene foam products (not shown).

Generally speaking, machine 1 comprises a fixed frame 2 and a mobile frame 3 arranged facing fixed frame 2. Mobile frame 3 is connected in known manner (not shown) to fixed frame 2 so as to move back and forth, in relation to the same, to and from a contact position and in the operating direction indicated by arrow 4 in FIG. 3.

Figure 1:
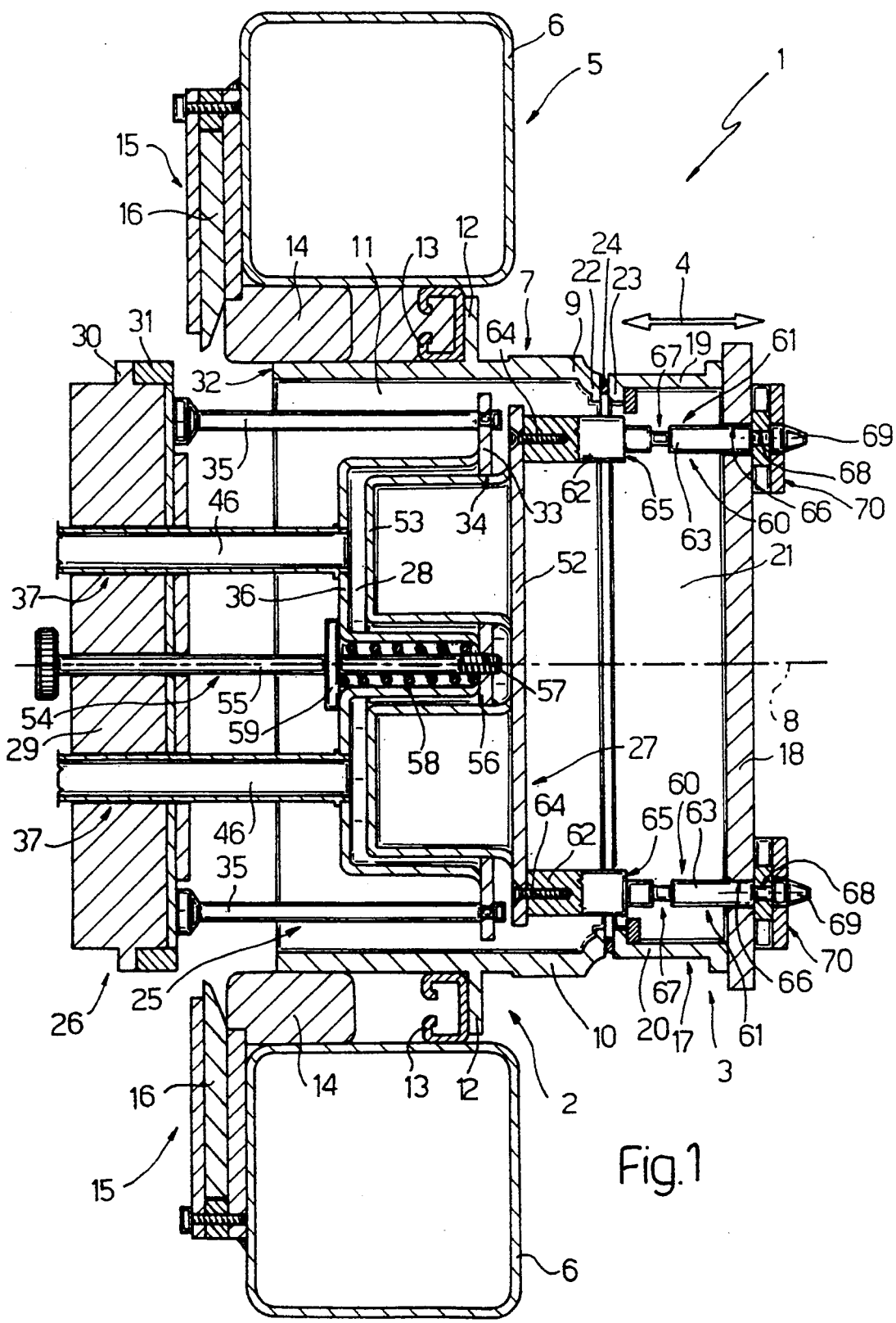
FIGS. 1, 2 and 3 show schematic vertical sections, with parts removed for simplicity, of a preferred embodiment of a machine for manufacturing polystyrene foam products in accordance with the present invention and in three different operating positions.
Figure 3:
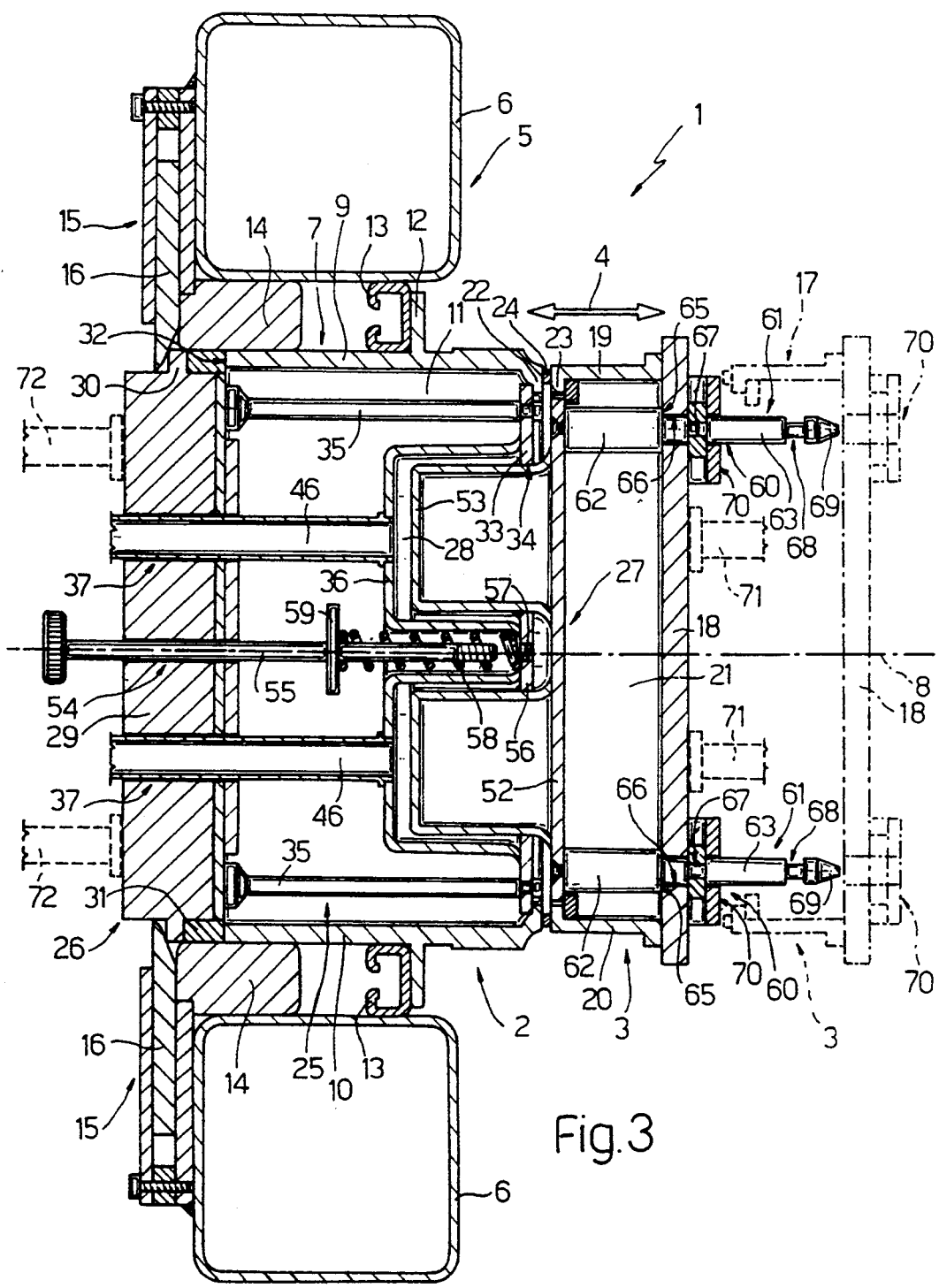
Figure 4:
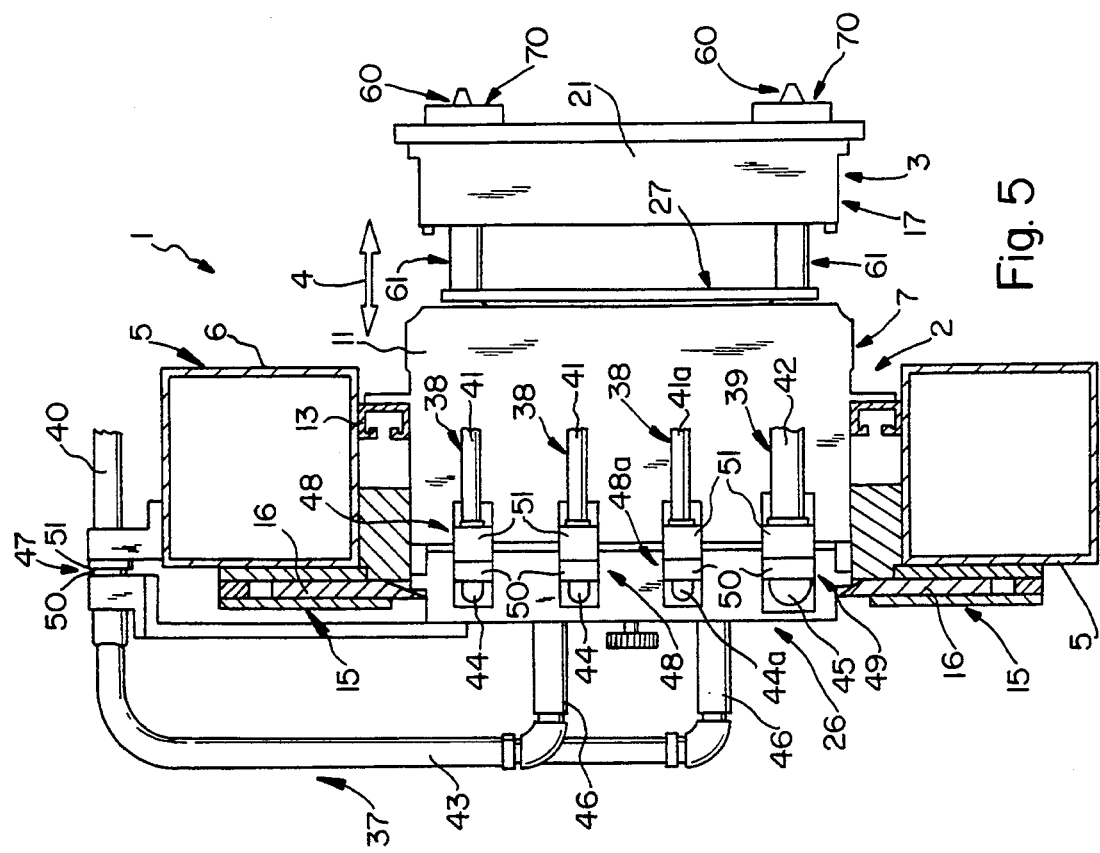
FIGS. 4 and 5 show partially sectioned side views of the machine in FIGS. 1 to 3 in two operating positions corresponding respectively to those in FIGS. 1 and 2.

With reference to the above, the term "contact position" used in connection with frames 2 and 3 is intended to mean that frames 2 and 3 are arranged contacting each other in the direction of arrow 4, i.e. in the position shown by the continuous line in FIGS. 1, 3 and 4.

As shown, for example, in FIG. 1, fixed frame 2 is defined by a fixed load-bearing structure 5 extending vertically upwards and comprising two tubular, substantially square-section cross members 6 located over and beneath a central housing 7 connected integral with cross members 6 and supported by the same at a given height over a base (not shown).

Housing 7 is tubular, is arranged with its axis 8 substantially horizontal and parallel to arrow 4, and comprises a substantially horizontal top wall 9 and bottom wall 10, and two substantially vertical lateral walls 11 facing and adjacent to respective cross members 6. Each wall 11 presents an outer rib 12, the lateral surface of which is connected integral with the outer surface of a channel section 13 located between and connected integral with wall 11 and respective cross member 6.

Between cross member 6 and the end portion of each wall 11 facing the opposite way to mobile frame 3, provision is made for a metal block 14 integral with both cross member 6 and housing 7, and projecting beyond the edge of cross member 6 for supporting and assembling, on the lateral surface of cross member 6 opposite that facing mobile frame 3, a guide device 15 for a preferably hydraulic bolt 16 described in detail later on.

As shown, for example, in FIG. 1, mobile frame 3 comprises a central housing 17 closed, on the side opposite that facing fixed frame 2, by a vertical plate 18 and mounted on slideways (not shown) preferably on said base (not shown) so as to move back and forth in said operating direction indicated by arrow 4. Housing 17 is tubular, is arranged with its axis coinciding with axis 8, and comprises a substantially horizontal top wall 19 and bottom wall 20 respectively coplanar with walls 9 and 10, and two substantially vertical lateral walls 21 coplanar with respective walls 11. The respective facing ends of housings 7 and 17 present respective flanges 22 and 23 which, when fixed and mobile frames 2 and 3 are arranged in the contacting position shown in FIGS. 1, 3 and 4, are arranged contacting each other via the interposition of a flexible seal 24.

As shown, for example, in FIG. 1, machine 1 also comprises a mold 25 in turn comprising a first and second half mold 26 and 27 designed to move in relation to each other to and from a closed position.

The term "closed position" is here and hereinafter used to indicate the mutual arrangement of half molds 26 and 27 shown in the accompanying drawings, i.e. wherein they define a closed molding chamber 28 having a volume corresponding with that of the polystyrene foam product (not shown) being produced.

In the example shown in the accompanying drawings, mold 25 is designed to produce substantially cylindrical-cup-shaped products (not shown) having a central tubular appendix.

Though the following description relates to this particular type of mold, chamber 28 may obviously be designed differently depending on the products being molded. Half mold 26, hereinafter referred to as the "fixed half mold", comprises a first vertical plate 29 perpendicular to axis 8 and having an outer contour substantially identical to the inner contour of housing 7, so as to fit inside housing 7, in the direction of arrow 4, and into the operating position shown in FIGS. 2 and 3, wherein an outer flange 30 on plate 29 rests, via the interposition of a flexible supporting element 31, on edge 32 of housing 7 on the opposite end to the edge defined by flange 22.

Thus positioned, plate 29 is secured to the end of housing 7 opposite the end facing mobile frame 3, by shifting bolts 16 from the withdrawn position (FIG. 1) clear of flange 30, to the extracted position (FIGS. 2 and 3) wherein flange 30 is locked axially in relation to housing 7.

Figure 2:
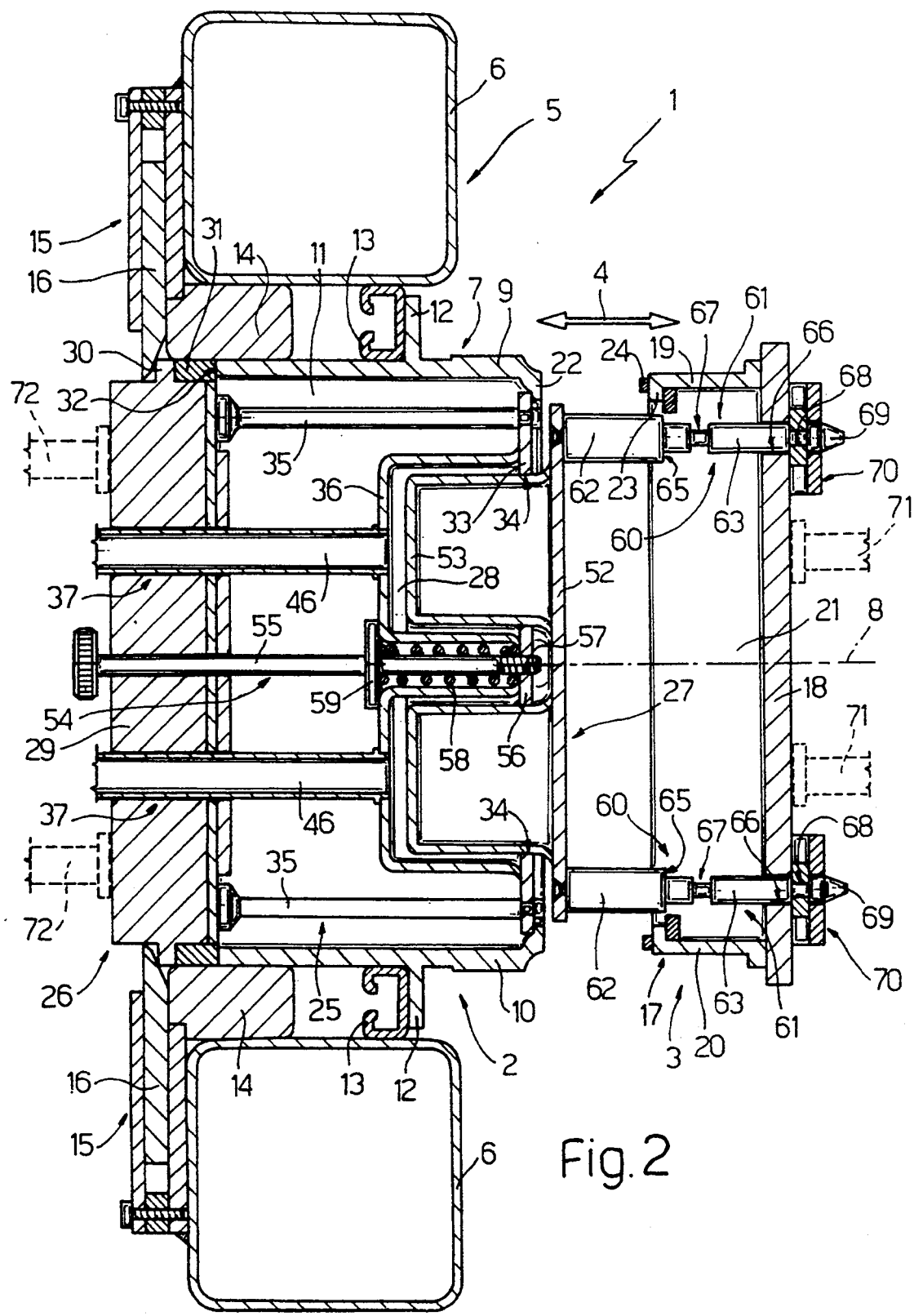
Figure 5:
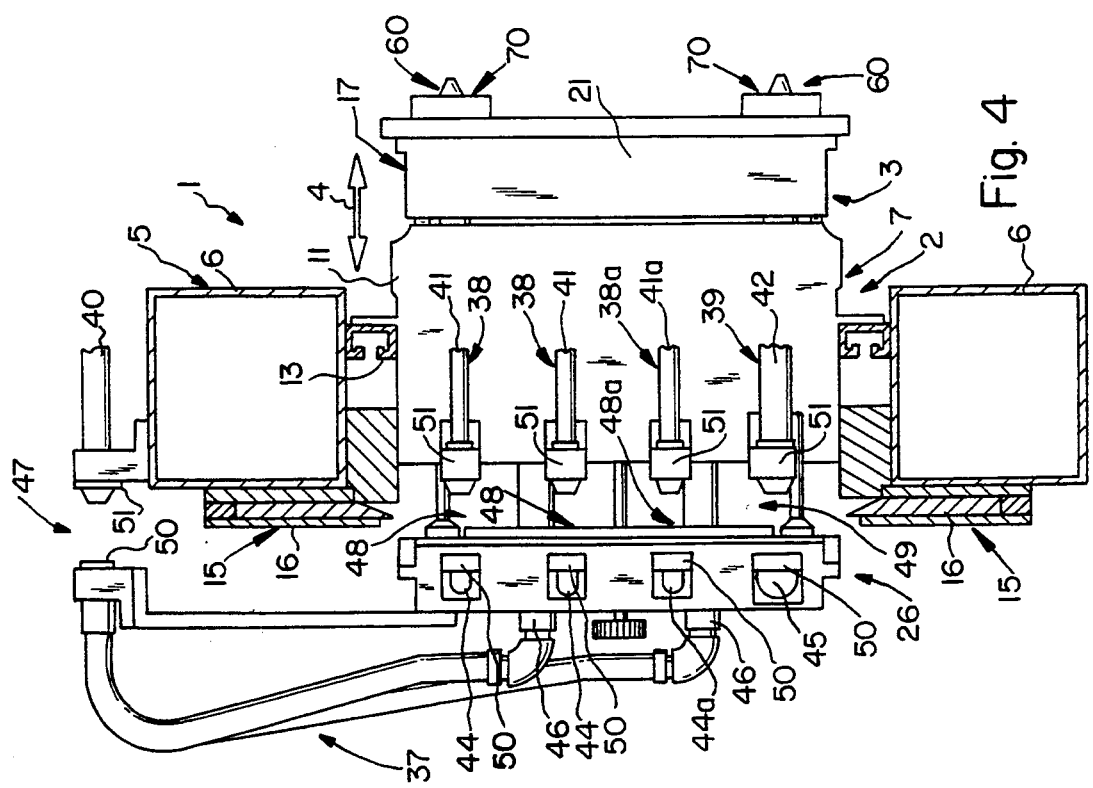

With reference to the above, the term "operating position" used in connection with fixed half mold 26 applies to half mold 26 mounted on fixed frame 2 with plate 29 locked by bolts 16, i.e. in the position shown in FIGS. 2, 3 and 5.

Fixed half mold 26 also comprises a second annular plate 33 parallel to plate 29 and having an inner edge 34 engaged in sliding manner, as described later, by a portion of half mold 27 hereinafter referred to as the "mobile half mold." Plate 33 is rendered releasably integral with plate 29 by means of a number of rods 35 parallel to axis 8, and is fitted, on the surface facing plate 29, with a hollow body 36 defining the surface of chamber 28 facing fixed frame 2, and housed inside housing 7 when fixed half mold 26 is locked in the operating position. In this position, plate 33 is also housed inside housing 7, substantially contacting flange 22.

As shown in FIGS. 4 and 5, machine 1 comprises a line 37 supplying granular polystyrene, and a number of lines supplying utility fluids to chamber 28 and comprising, for example, a number of curing steam supply lines 38, a cooling water supply line 38a, and a compressed air supply line 39.

Lines 37, 38, 38a and 39 comprise respective input portions 40, 41, 41a and 42 connected integral with fixed frame 2, and respective output portions 43, 44, 44a and 45 on fixed half mold 26. In particular, output portion 43 of line 37 comprises a number of injectors 46 (only two of which are shown) for injecting granular polystyrene directly into chamber 28.

As shown in FIG. 5, when fixed half mold 26 is locked in the operating position on fixed frame 2, input portions 40, 41, 41a and 42 are connected to respective output portions 43, 44, 44a and 45 by means of fast-fit couplings 47, 48, 48a and 49, each comprising, as shown in FIG. 4, a mobile half coupling 50 on fixed half mold 26, and a fixed half coupling 51 on fixed frame 2. Half couplings 50 and 51 are arranged facing each other in the direction of arrow 4, so that, when fixed half mold 26 is moved into said operating position, couplings 47, 48, 48a and 49 lock automatically.

As shown in FIGS. 1 to 3, mobile half mold 27 comprises a plate 52 shaped so as to engage an opening defined by flange 23, and arranged perpendicular to axis 8 and facing plate 33. The surface of plate 52 facing plate 33 is fitted integral with a body 53 designed to fit inside body 36 so as to define, with the same, said chamber 28 when half molds 26 and 27 are arranged in said closed position shown in FIGS. 1 to 3.

In connection with the above, it should be pointed out that, whereas the term "closed position" is used to indicate half molds 26 and 27 arranged in such a position as to define chamber 28, the term "molding position" will be used to indicate half molds 26 and 27 arranged in the closed position, and half mold 26 in the operating position.

Half molds 26 and 27 are locked in releasable manner in said closed position by a lock device 54 which, in the example shown, comprises a rod 55 extending, in rotary and axially-sliding manner and parallel to axis 8, through a hole formed in plate 29. Device 54 also comprises a plate 56 integral with shaped body 53 and having a threaded through hole 57 engaged by a threaded end portion of rod 55 against the thrust exerted by a spring 58 compressed between plate 56 and an intermediate flange 59 on rod 55, on the opposite side of shaped body 36 in relation to plate 56.

Mobile half mold 27 is connectable to mobile frame 3 by means of a coupling device 60 on mobile frame 3. Said device 60 comprises a number of pins 61 (only two of which are shown) extending from plate 52 towards plate 18, parallel to axis 8, and each comprising a first and second substantially cylindrical portion 62 and 63. Said first portion 62, connected to plate 52 by an axial screw 64, is larger in diameter than said second portion, so as to define an annular connecting shoulder 65 separated from plate 52 by a distance substantially equal to the length of housing 17, so that, when shoulder 65 contacts plate 18 (FIG. 3), plate 52 is substantially coplanar with flange 23.

Portion 63 of each pin 61 engages in sliding manner a respective through hole 66 in plate 18, and presents a first and second annular groove 67 and 68 located a given distance apart, and a tip 69. In particular, the distance between groove 67 and shoulder 65 is equal to the thickness of plate 18, while groove 68 is located close to tip 69 and may even be dispensed with, as described later on.

Finally, for each pin 61, coupling device 60 comprises a releasable clip joint 70 on wall 18, designed to selectively engage grooves 67 and 68 for locking mobile frame 3 in relation to mobile half mold 27 in two axial positions respectively referred to hereinafter as the "work position" and "pull position."

As shown by the dotted line in FIG. 3, machine 1 comprises a number of push elements 71 connected to mobile frame 3 for moving it in the direction of arrow 4, and may optionally comprise further external push elements 72 for moving mold 25 into said operating position in the direction of arrow 4.

In actual use, mold 25 is assembled on to machine 1 as follows.

Firstly, mold 25, with half molds 26 and 27 maintained in the "closed position" by device 54, is moved, e.g. by means of a carriage (not shown), in the direction of arrow 4 towards fixed frame 2, until half mold 27 is housed completely inside housing 7. At the same time, mobile frame 3 is maintained in the "contact position" by pushers 71.

Mold 25 is fed forward by said carriage (not shown) until pins 61 on mobile half mold 27 engage respective holes 66 in plate 18, and respective grooves 68 project beyond plate 18. At this point, clip joints 70 are activated for locking mobile frame 3 in relation to half mold 27 in said "pull position" and push elements 71 are activated for moving mobile frame 3 away from fixed frame 2 and so moving mold 25 towards fixed frame 2 and into said "operating position" wherein mold 25 is locked by clamping fixed half mold 26 via bolts 16.

In the above process, mobile frame 3 thus provides, among other things, for moving mold 25 rapidly and accurately into said "operating position."

As already stated, upon mold 25 moving into said "operating position", fast-fit couplings 47, 48 48a and 49 lock automatically, thus enabling mold 25, in one movement of mobile frame 3, to be assembled rapidly, fully automatically and in fully operative manner on to fixed frame 2.

Once mold 25 is engaged by bolts 16, joints 70 are released to enable push elements 71 to move mobile frame 3 into said "contact position." At the same time, portions 63 of pins 61 slide along holes 66 until joints 70 engage grooves 67, thus locking mobile frame 3 on to half mold 27 in said "work position."

Finally, lock device 54 is eliminated for mutually releasing half molds 26 and 27 and enabling mobile frame 3 to move back and forth in the direction of arrow 4, thus opening and closing mold 25, and enabling granular polystyrene and utility fluids to be fed into molding chamber 28, during the successive intervals in which mold 25 is closed, for producing the required polystyrene foam products.

For removing mold 25 at the end of the process or for maintenance purposes, the above procedure is obviously performed in reverse.

The above assembly (or reverse disassembly) and molding procedure may be varied if, instead of connecting mobile frame 3 to mobile half mold 27 and subsequently withdrawing frame 3 from said "contact position", final displacement of mold 25 into said "operating position" is performed directly by push elements 72 connected to mold 25 (and consisting, for example, of a powered carriage).

In this case, grooves 68 are dispensed with, and mobile frame 3 is maintained in a withdrawn position (shown by the dotted line in FIG. 3) clear of pins 61, until mold 25 is locked into the "operative position." Only at this point is mobile frame 3 moved by push elements 71 into the "contact position" wherein joints 70 are activated for locking mobile frame 3 on to mobile half mold 27 in said "work position."

I claim:

1. A machine (1) for manufacturing polystyrene foam products, said machine (1) comprising:
    a fixed frame (2);
    a mobile frame (3) connected to said fixed frame (2) so as to move, in relation to said fixed frame (2), back and forth in a given operating direction (4) and to and from a contact position;
    a mold (25) comprising a first half (26) and a second half (27) mold defining, when in a closed position, a molding chamber (28);
    a line (37) supplying granular polystyrene;
    a number of lines (38, 38a, 39) supplying utility fluids, each said supply line (37, 38, 38a, 39) comprising an input portion (40, 41, 41a, 42) on said fixed frame (2) and an output portion (43, 44, 44a, 45) on said first half mold (26);

first (16) and second (60) lock means for respectively locking said first half mold (26) in an operating position on said fixed frame (2) and said second half mold (27) onto said mobile frame (3), said first lock means (16) comprising bolt means, said second lock means (60) comprising releasable coupling means (61, 70) for connecting said mobile frame and said second half mold (27);

releasable means (54) for connecting said half molds (26, 27) in said closed position; and a mobile half coupling (50) and a fixed half coupling (51) located on each said supply line (37, 38, 38a, 39) and arranged facing each other in said operating direction (4), said mobile and fixed half couplings (50, 51) of each said supply line (37, 38, 38a, 39) being connected in said operating positions so as to connect said respective input (40, 41, 41a, 42) and output (43, 44, 44a, 45) portions, and being respectively integral with said fixed frame (2) and said first half mold (26).

2. The machine as defined in claim 1, wherein said coupling means (61, 70) comprises at least a first element (61) integral with said second half mold (27) and a second element (70) integral with said mobile frame (3) and selectively connectable to said first element (61) in two distinct positions, each said element (61, 70) corresponding to a respective relative position of said second half mold (27) and said mobile frame (3) in said operating direction (4), one of said two distinct positions being such that, when said first half mold (26) is in said operating position and said mobile frame (3) is moved into said contact position, said second half mold (27) moves into said closed position.

3. The machine as defined in claim 2, wherein said mobile frame (3) comprises a plate (18) positioned substantially perpendicular to said operating direction having at least one through hole (66), said first element (61) comprising a pin extending from said second half mold (27) in said operating direction (4), said pin having an end portion (63) designed to engage said through hole (66) and having two portions (67, 68) selectively engageable by said second element (70).

4. The machine as defined in claim 3, wherein said second element (70) is a clip-on element on said plane (18), and wherein each said portion (67, 68) is defined by an annular groove formed on said end portion (63).

* * * * *